Jan. 19, 1954  R. BECK ET AL  2,666,328
THERMOMETER CASE
Filed May 19, 1948  2 Sheets-Sheet 1
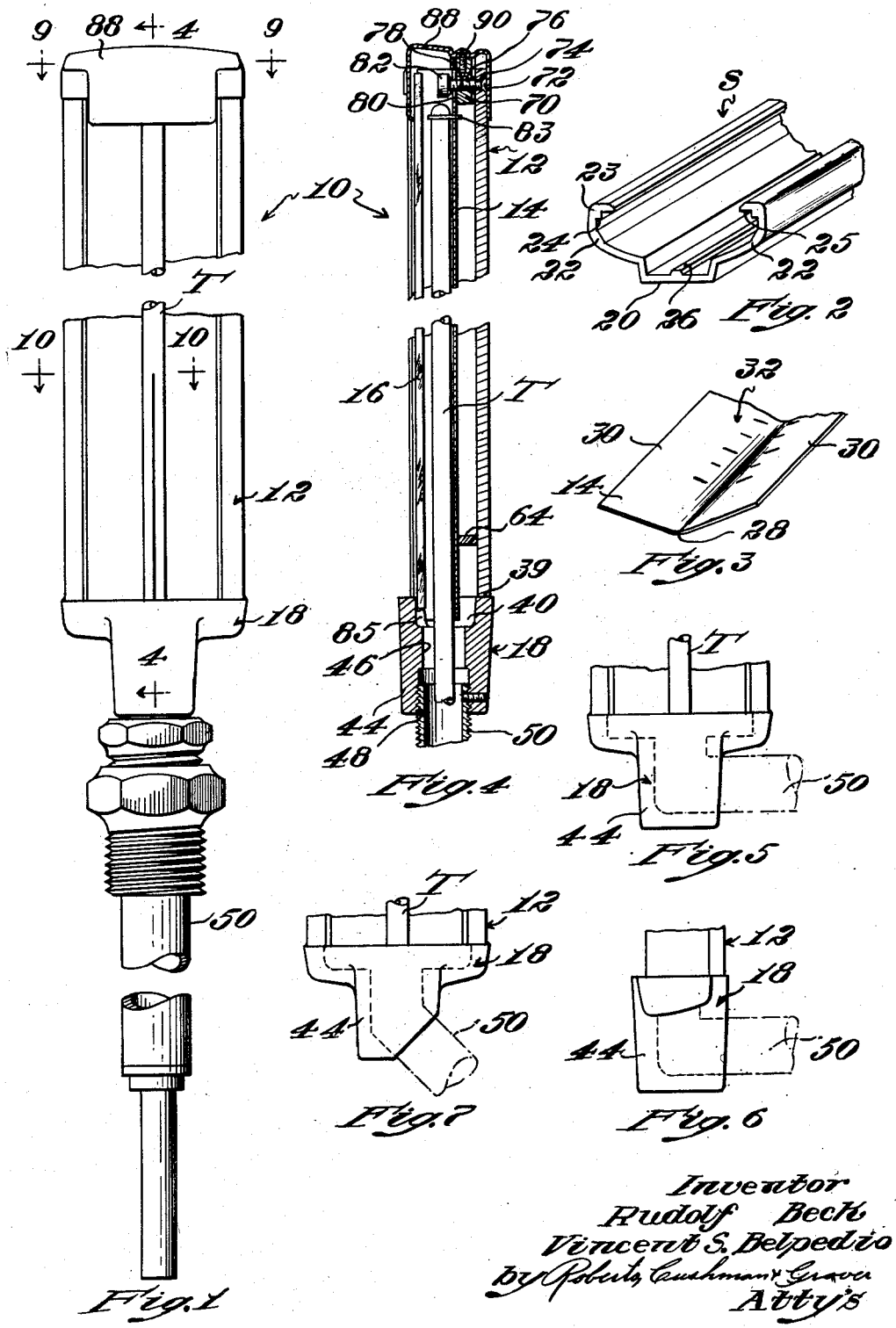
Inventor
Rudolf Beck
Vincent S. Belpedio
by Roberts, Cushman & Grover
Atty's

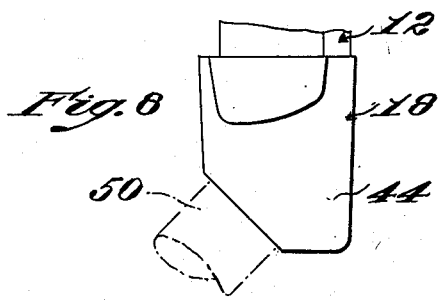
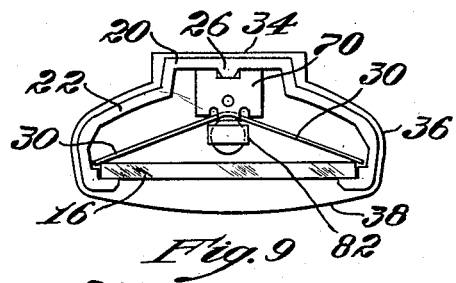
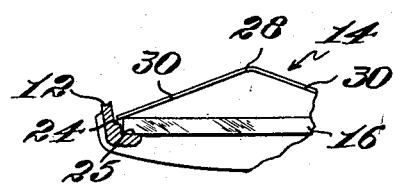
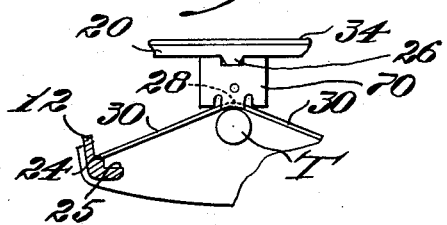
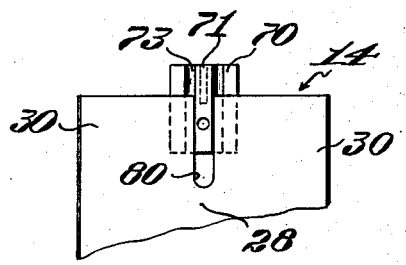
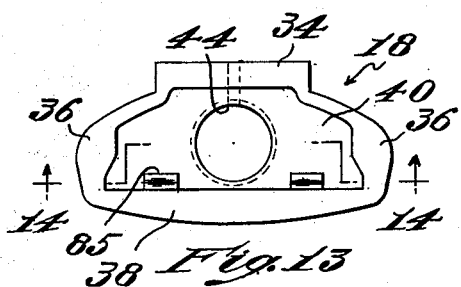
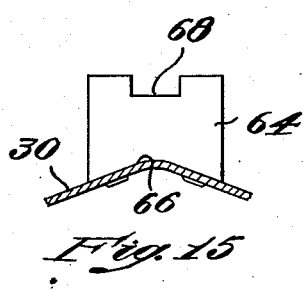
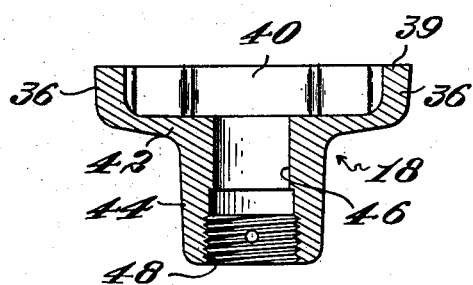

Patented Jan. 19, 1954

2,666,328

UNITED STATES PATENT OFFICE 2,666,328

THERMOMETER CASE

Rudolf Beck and Vincent S. Belpedio, Fairfield, Conn., assignors to Manning, Maxwell & Moore, Incorporated, New York, N. Y., a corporation of New Jersey Application May 19, 1948, Serial No. 27,926

6 Claims. (Cl. 73—374)

This invention relates to temperature recording devices and, more especially, to improvements in thermometers and thermometer cases. It is customary in thermometer construction to provide a hollow case, having an open front wall, within which there is disposed a thermometer tube and a scale and to close the open front with a transparent cover, such as glass or plastic, which protects the thermometer tube from damage and yet allows inspection thereof. Usually the scale is marked on a strip of metal or paper which is fastened to the back of the case behind the thermometer tube, the latter being fixed by one or more clips within the case against the back wall substantially centrally thereof. Such prior thermometer cases are usually manufactured in several sizes and styles but have no interchangeable or common parts so that the manufacturer must keep on hand a large inventory of parts and must be tooled up for making the several sizes, which is uneconomical. Moreover, if a customer wants a thermometer differing in size or style from any of those kept in stock, the manufacturer must make this up specially which usually entails delay and considerable expense to the customer.

Objects of this invention are to provide a thermometer case of such design that the various parts may be selected from a common stock and assembled to provide substantially any size and/or style thermometer that may be desired, and wherein the stock parts may be supplied to a customer for his own use in making up the thermometers to fit his particular need. Other objects of the invention are to provide an improved thermometer case the component parts of which may be manufactured with very little machining, which may be assembled together with a minimum of skill, and wherein the cover plate is removably held in place in part by the scale plate, the correct position of the scale plate, however, being independent of the transparent cover plate. Still further objects of the invention are to provide a case which is durable, which may be repaired on the spot from stock parts without special tools and at a minimum cost and delay.

According to the invention, the case comprises an elongated hollow body portion having a flat back, forwardly curving side walls, an open front and open ends. The body portion of the case is cut from a continuous length of stock pre-shaped to the desired contour which preferably may be extruded and one of its open ends is butt brazed to a hollow base. The longitudinal marginal edges of the side walls bordering the open front have rearwardly directed spaced bearing surfaces against which may be placed a transparent cover plate to close the open front. Within the body portion of the case there is placed a scale plate which is in the form of a thin strip of sheet metal bent longitudinally to provide an apex and diverging legs. The scale plate is slid endwise into the open end of the body of the case and is held therein by compressive engagement of its apex and legs between the back of the case and the aforesaid spaced bearing surfaces in the absence of the cover plate so that its position is established and maintained by its own resilience. There is a spacer fixed to the upper portion of the back wall of the case between the apex of the scale and the back wall against which the apex bears, and a second spacer of similar shape is fastened, as by riveting, to the apex of the scale itself near its lower end, this latter spacer being free to move relatively to the back of the case. A screw passing through the back wall and through the upper spacer retains it in place and has an inwardly projecting shank upon which the scale is adjustably suspended by way of a slot in the upper end of the scale in the apex portion thereof and a nut threaded onto the shank against the scale. To center the spacers along the center line of the case an inwardly directed rib or track is formed in the back wall and the spacer members have grooves therein adapted to fit over the track. The legs of the scale plate, in the absence of a cover plate, press against the spaced bearing surfaces but are sufficiently resilient to permit the cover plate to be slid into the case between them and the spaced bearing surfaces and to retain the cover plate therein by engagement with the rear longitudinal corners of the plate. The spaced bearing surfaces preferably are stepped to provide a shallow recess in which at least a portion of the thickness of the cover plate is seated and hence to form lateral abutments for engagement with the edges of the plate so that it is prevented from shifting in its own plane as well as rearwardly by the legs of the scale plate. A removable cap is applied to the open top end of the case to form a closure therefor and at the same time to permit ready access to the adjusting means.

The invention will now be described in detail with reference to the accompanying drawings in which:

Fig. 1 is a front elevation of the thermometer casing to the lower end of which is attached coupling means adapted to be threaded into a horizontal wall and to hold the case vertical with respect thereto;

Fig. 2 is an isometric view of a fragmentary portion of a continuous length of preshaped stock from which the body portions of the hollow case may be cut;

Fig. 3 is an isometric view of a fragmentary portion of the scale plate;

Fig. 4 is a vertical section taken on the line 4—4 of Fig. 1;

Fig. 5 is a fragmentary elevation at the lower portion of the thermometer case showing it butt brazed to a base which has coupling means arranged to project horizontally from one side of the base for attachment to a vertical wall to hold the case vertically;

Fig. 6 is a fragmentary elevation at the lower portion of the thermometer case showing it butt brazed to a base which has a coupling means arranged to project horizontally from the back;

Fig. 7 is a fragmentary elevation at the lower portion of the thermometer case showing it butt brazed to a base which has a coupling means arranged to project angularly from one side;

Fig. 8 is a fragmentary elevation at the lower portion of the thermometer case showing it butt brazed to a base which has a coupling means arranged to project angularly from the front;

Fig. 9 is a top view on the line 9—9 of Fig. 1 with the cap removed;

Fig. 10 is a fragmentary horizontal cross-section on the line 10—10 of Fig. 1 with the transparent cover plate in place;

Fig. 11 is a corresponding section on the line 10—10 of Fig. 1 with the transparent cover plate removed;

Fig. 12 is a front elevation of a fragmentary portion of the scale at the upper end thereof showing the upper spacer member associated therewith;

Fig. 13 is a top view of a base with a bottom opening;

Fig. 14 is a vertical section on the line 14—14 of Fig. 13; and

Fig. 15 is a plan view of the lower spacer block.

Referring to the drawings, the thermometer case 10 is shown as being comprised essentially of an elongated body portion 12, a scale plate 14, a cover plate 16, and a hollow base 18, assembled together to house a thermometer tube T of suitable kind, as will appear hereinafter.

The body portion 12 is cut from a continuous strip of stock S, a fragmentary portion of which is shown in Fig. 2, which has a substantially flat rear wall 20, curved side walls 22 which extend forwardly therefrom, and an open front. The forward edges of the side walls are directed inwardly toward each other and have rearwardly facing, longitudinally extending, stepped, substantially flat, rear and forward bearing surfaces 24 and 25 for a purpose which will appear hereinafter. Along the center line of the inside of the back wall 20 there is a forwardly directed rib or track 26. The strip of stock S from which the body portion is cut is preferably supplied in continuous lengths and may be made by extruding suitable material through a properly shaped die. Preferably a metal capable of extrusion is employed, although any other material which may be extruded and will become rigid and non-frangible upon setting may be employed if it is otherwise suitable.

The scale plate 14 (Fig. 3) is V-shaped, having an apex 28 and diverging legs 30, 30. On the concave side of the plate there are marked graduations 32 which represent one or more scales of degrees, for example, by impressing the graduations into the metal or by painting them thereon. The plates are preferably made of stiff, springy metal; however, plastic, hard rubber or any other stiff, springy material may be employed.

The base 18, as shown in Figs. 13 and 14, comprises a forging having a flat rear wall 34 and side walls 36 which follow substantially the contour of the cross-section of the casing, and a front wall 38 which defines a cavity 40 open at its top end but closed at its lower end by a bottom wall 42. The top end of the base has a flat surface 39 bordering its opening. A downwardly projecting neck 44 is forged integral with the bottom wall, and through this and the lower wall 42 there is formed an aperture 46, the lower end of which is threaded at 48 to receive a thermometer stem 50. While the thermometer stem 50, as shown in Fig. 1, projects vertically downward from the neck 44 so that the thermometer case will occupy a vertical position when attached to a horizontal wall, the stem 50 may be threaded into the front, back, or sides of the base in horizontal or angular positions, so that the thermometer may be attached to a vertical wall or a sloping wall and still retain its vertical position.

To this end each base forging is provided with a substantially cube-shaped hollow neck 44 which is closed at its bottom end. When it is determined what position the thermometer is to occupy and to what kind of a surface it is to be attached, the neck may then be milled to provide a complementary surface. That is, if the thermometer is to be attached to an inclined surface, the neck is milled at an angle, as, for example, shown in Fig. 7 to provide a surface which is the complement of the inclined surface to which it is to be attached, whereupon the milled surface is drilled and tapped for reception of the stem 50, or if the thermometer is to be attached to a vertical surface, one side of the neck is milled off smoothly and is then drilled and tapped. This feature is of considerable importance and economic advantage as only a single forging tool is required to make the base forgings and an inventory of only one forging is required.

With the aforesaid component parts a thermometer of a given size may be assembled by selecting a body portion 12 of suitable length, butt brazing it to the upper surface 39 of a selected base 18, for example, the base having the bottom coupling (Fig. 14) and then inserting the scale plate and cover plate. Prior to placing the scale plate 14 in the body portion, a spacer member in the form of a small block 64 (Fig. 15), having a V-shaped recess 66 in its front face adapted to embrace the apex of the scale plate and a groove 68 in its rear face adapted to seat on the rib 26, is fixed as by riveting to the lower end thereof. The scale plate is then placed into the body portion of the casing by sliding it endwise into its upper end with its legs 30 pressed against the rear bearing surfaces 24 (Fig. 11), and with the spacer 64 interposed between its apex and the back wall of the casing. The groove 68 is of such cross-section as slidably to fit over the track 26 and hence to center the scale plate with respect to the casing. A second spacer block 70 (Fig. 9) of substantially corresponding cross-section but somewhat thicker from top to bottom is then placed between the back of the scale plate and the case near its upper end. This spacer, unlike the prior spacer, is not attached to the scale plate but is attached to the upper end of the casing by means of a screw 72 which is passed through an aperture 74 in the rear wall of the casing and is threaded in an aperture 76 formed through the spacer. The front face of this spacer also differs from the lower spacer in that it has a tongue 71 (Fig. 12) centrally thereof which is flanked by grooves 73. The spacers wedge the scale plate in position so that it will not become dislocated after it has been adjusted to its proper position. The shank 78 of the screw extends forwardly from the spacer block and through a slot 80 formed in the apex portion of the scale plate near its upper end. A nut 82 threaded onto the end of the screw into engagement with the scale secures the same to the spacer. It is to be observed that the tongue 71 projects into the slot 80, thus serving as a centering means. The provision of the slot 80 permits adjustment of the scale plate vertically with respect to the casing to compensate for seasoning of the glass of the thermometer tube. The thermometer tube T is then placed in the body portion of the case against the scale plate and is supported at its upper end by a spring clip 83 (Fig. 4) fastened to the scale plate. The thermometer tube extends downwardly along the face of the scale plate in the crotch between the legs and into the base, the lower portion thereof being suitably shaped to pass through the vertical or angular opening 46 in the base.

The cover plate 16, which is provided to close the open front wall of the body portion of the casing and to protect the thermometer tube from damage, may be made of glass or a suitable transparent plastic and furnished in sheets which may be cut up into suitable sizes. The cover plate is inserted in the casing between the forward bearing surfaces 25, 25 which border the side walls and the legs 30, 30 (Fig. 10) of the scale by deflecting the latter rearwardly and sliding the cover plate endwise into the open end of the casing beneath them. The legs 30, 30 will bear against the rear edges of the cover plate and by their resilience will yieldably hold the cover plate in position after it is inserted in place. It is to be observed that the presence or absence of the cover plate will not adversely affect the position of the scale plate, hence the thermometer can be used even though the cover plate is damaged by breaking and must be removed, since the position of the scale is maintained independently of the cover plate by engagement of the legs 30, 30 with the surfaces 24, 24. The bearing surfaces 25, 25 lie inwardly and forwardly of the bearing surfaces 24, 24 forming a shallow recess which partially receives the thickness of the plate and thus prevents lateral shifting of the plate. The lower end of the cover plate rests upon a pair of ledges 85 in the base 18. When the cover plate is in place the legs 30 bear against the rear longitudinal corners of the cover plate forcing it against the bearing surface 25.

The upper end of the casing is closed by a cap 88 which has a top, side and end walls adapted telescopically to be placed over the open end of the casing and is secured thereto by a screw 90 threaded into the top of the spacer 70. By removing the cap access may be had to the casing to adjust the vertical position of the scale plate by simple manipulation of the screw and nut 72 and 82 or to replace a broken cover plate.

It should be understood that the present disclosure is for the purpose of illustration only and that this invention includes all modifications and equivalents which fall within the scope of the appended claims.

We claim:

1. A thermometer case comprising an elongated hollow body having a back, side walls, an open front and open ends, said body portion being of continuous uninterrupted uniform cross section from end to end, the longitudinal marginal edges of the side walls bordering the open front having rearwardly facing bearing surfaces, a longitudinally bent strip of resilient metal having an apex and diverging legs, on which is marked a graduated scale, said strip being removably frictionally disposed within the case with its legs yieldably engaging said bearing surfaces by compressive engagement of its apex and legs between the back of the case and said bearing surfaces so that its position is established and maintained by its own resilience, said legs being yieldably displaceable inwardly from said bearing surfaces to receive between them and said bearing surfaces a transparent closure for closing the open front.

2. A thermometer case according to claim 1 wherein the bearing surfaces have fore and aft stepped portions, a cover plate is disposed against the fore portion, and said diverging legs of the bent scale strip alternatively bear against the cover plate holding it against the fore portion of the stepped bearing surfaces when the plate is in place and against the aft portions when the plate is absent.

3. A thermometer case according to claim 1 wherein longitudinally spaced spacers are located between the apex of the bent scale strip and the back wall of the case.

4. A thermometer case according to claim 1 wherein the upper one of the spacers is fastened to the back of the case near the top and the lower one is attached to the apex of the scale strip at its lower end.

5. A thermometer case comprising an elongated hollow body having a back, side walls, and an open front, said body portion being of continuous uniform cross section from end to end, the longitudinal marginal edges of the side walls bordering the open front having rearwardly facing coextensive bearing faces, a transparent cover plate disposed within the case adjacent said bearing surfaces, a first spacer fastened to the back of the case, a longitudinally bent strip of stiff, springy metal having an apex and diverging legs, on which is marked a graduated scale, a second spacer like said first spacer fastened to the apex of the strip near its lower end, said strip being wedged into the case with its legs pressed against the rear corner of the cover plate, its upper apex pressed against the fixed spacer and with the spacer at its lower end pressed against the case, a screw passing through the back of the case at the upper end, through the first spacer, and through a slot in the upper end of the strip, and a nut threaded on the screw whereby the vertical position of the strip may be adjusted and fixed with respect to the case.

6. A thermometer case comprising a hollow body having a back, side walls, and an open front, said body portion being of continuous uniform cross section from end to end, the longitudinal marginal edges of the side walls bordering the open front having rearwardly facing coextensive bearing faces, a transparent cover plate disposed within the case adjacent said bearing surfaces, an inwardly directed rib on the inside of said back wall extending centrally from end to end, a first spacer having a recess therein engaged with the rib for holding the spacers against lateral displacement, a screw passing through the back and said first spacer for fixing the first spacer to the back, said screw having a forwardly extending shank, a longitudinally bent scale plate of resilient metal having an apex and diverging legs, said plate having in its upper end a slot and near its lower end a second spacer riveted to its back, said plate being wedged into the case with the shank of the screw extending through said slot, with said second spacer engaging the back of the case and with its legs pressed against the rear edges of the cover plate, a nut engaged with the shank of the screw to clamp the scale plate in a given vertical position against the upper spacer, and a cap having a top and skirt telescopically engaged with the top end of the case.

RUDOLF BECK.
VINCENT S. BELPEDIO.

References Cited in the file of this patent

UNITED STATES PATENTS

| Number | Name | Date |
|---|---|---|
| 1,796,062 | Swanson | Mar. 10, 1931 |
| 2,184,472 | Sand | Dec. 26, 1939 |
| 2,389,485 | Bruns | Nov. 20, 1945 |
| 2,448,271 | McClintock | Aug. 31, 1948 |
| 2,485,690 | Beck | Oct. 25, 1949 |

FOREIGN PATENTS

| Number | Country | Date |
|---|---|---|
| 822,630 | France | Sept. 27, 1937 |
| 585,491 | Great Britain | Feb. 7, 1947 |